US007583489B2

(12) United States Patent
Swearingen

(10) Patent No.: US 7,583,489 B2
(45) Date of Patent: Sep. 1, 2009

(54) TUNGSTEN SHORTING STUB AND METHOD OF MANUFACTURE

(75) Inventor: Kendrick Van Swearingen, Woodridge, IL (US)

(73) Assignee: Andrew LLC, Hickory, NC (US)

( * ) Notice: Subject to any disclaimer, the term of this patent is extended or adjusted under 35 U.S.C. 154(b) by 492 days.

(21) Appl. No.: 11/468,708

(22) Filed: Aug. 30, 2006

(65) Prior Publication Data

US 2007/0268645 A1 Nov. 22, 2007

Related U.S. Application Data

(60) Provisional application No. 60/747,920, filed on May 22, 2006.

(51) Int. Cl.
*H02H 3/22* (2006.01)
*H02H 1/00* (2006.01)

(52) U.S. Cl. ...................................................... 361/119

(58) Field of Classification Search .................. 361/119
See application file for complete search history.

(56) References Cited

U.S. PATENT DOCUMENTS 3,289,117 A 11/1966 Kearns et al
4,236,188 A 11/1980 Prochazka
4,409,637 A 10/1983 Block
4,525,690 A 6/1985 De Ronde
4,584,624 A 4/1986 Hines
4,701,825 A 10/1987 Pagliuca
4,731,111 A * 3/1988 Kopatz et al. ................. 75/342
5,053,910 A 10/1991 Goldstein
5,314,658 A * 5/1994 Meendering et al. .......... 419/33
5,745,328 A 4/1998 Bellantoni
5,982,602 A 11/1999 Tellas et al.
6,061,223 A 5/2000 Jones et al.
6,101,080 A 8/2000 Kuhne
6,236,551 B1 5/2001 Jones et al.
6,452,773 B1 9/2002 Aleksa et al.
6,636,408 B2 10/2003 Pagliuca
6,688,916 B1 2/2004 Lee
6,721,155 B2 4/2004 Ryman
6,785,110 B2 8/2004 Bartel et al.
7,483,251 B2 * 1/2009 Davis et al. ................. 361/119
2002/0178862 A1 * 12/2002 Smith et al. ................... 75/236
2004/0100751 A1 5/2004 Ammann
2004/0169986 A1 9/2004 Kauffman
2008/0151461 A1 * 6/2008 Kauffman ................... 361/119

* cited by examiner

*Primary Examiner*—Ronald W Leja
(74) *Attorney, Agent, or Firm*—Babcock IP, PLLC

(57) ABSTRACT

A shorting stub for connection between an inner conductor and an outer conductor of a coaxial cable. The shorting stub of a tungsten or tungsten alloy, having a connecting portion between an inner conductor connection and an outer conductor connection. The shorting stub may be cost effectively formed using metal injection molding techniques. The connecting portion may be formed by a plurality of loop segments in a range of different configurations. If needed, one or more supports may be applied to support the shorting stub during the metal injection molding.

15 Claims, 4 Drawing Sheets

TUNGSTEN SHORTING STUB AND METHOD OF MANUFACTURE

CROSS REFERENCE TO RELATED APPLICATIONS

This application claims the benefit of U.S. Provisional Patent Application No.: 60/747,920 filed May 22, 2006 and hereby incorporated by reference in the entirety.

BACKGROUND

1. Field of the Invention

The invention generally relates to improvements in the operating power level and or surge capacity of RF devices such as shorting stubs for coaxial cables. More particularly, the invention relates to improved materials and manufacturing processes for these devices.

2. Description of Related Art

A major limitation in the power handling of a helical and or spiral planar shorting stub is its resistance to deformation when surged by lightning. The positive benefits of the fields generated by the interaction of the "rings" of the spiral become a liability when the calculated geometry is deformed by a surge and the device is no longer electrically balanced for its target frequency range.

Prior shorting stubs have significant surge limitations and or size requirements because of the characteristics of the conventional materials previously applied (Brass, Phosphor Bronze, Aluminum). Where the shorting stub has a helical or spiral geometry the interactive effects of the fields generated during a surge event will damage and or destroy the shorting stub if the surge is of too high a level.

For example, limitations in the range of 25-30 KA are known to exist for shorting stub assemblies utilizing conventional materials unless the overall size of the shorting stub is extended to the point where the size and materials cost(s) become unacceptable.

Competition within the electrical cable and associated accessory industries has focused attention on increased manufacturing efficiencies, overall component size reduction and increased power handling capability.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
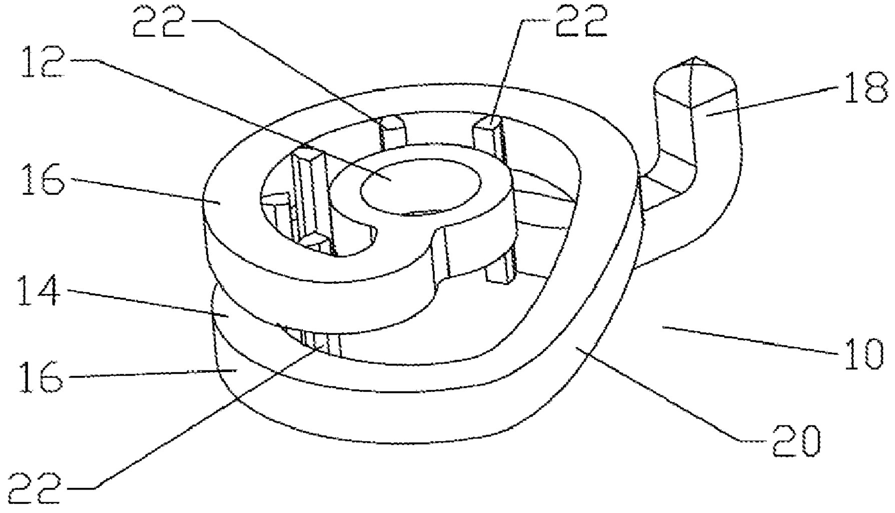
FIG. 1 is a schematic isometric view of an exemplary multi-planar shorting stub, including a plurality of inner diameter supports.
Figure 2:
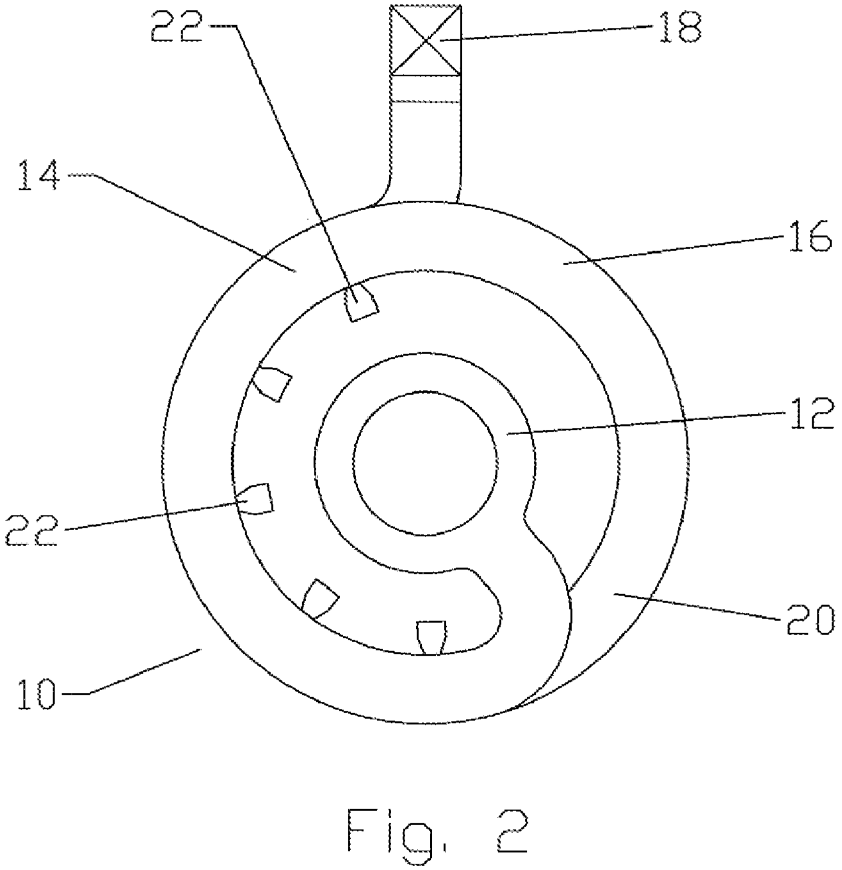
FIG. 2 is a schematic top view of FIG. 1.
Figure 3:
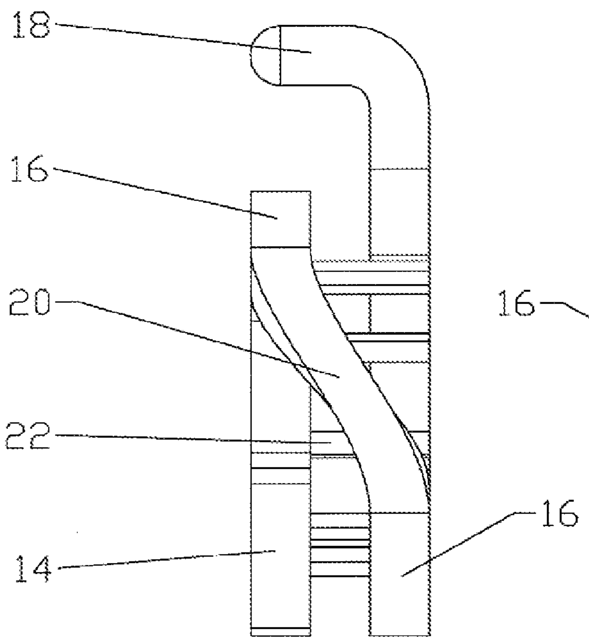
FIG. 3 is a schematic front side view of FIG. 1.
Figure 4:
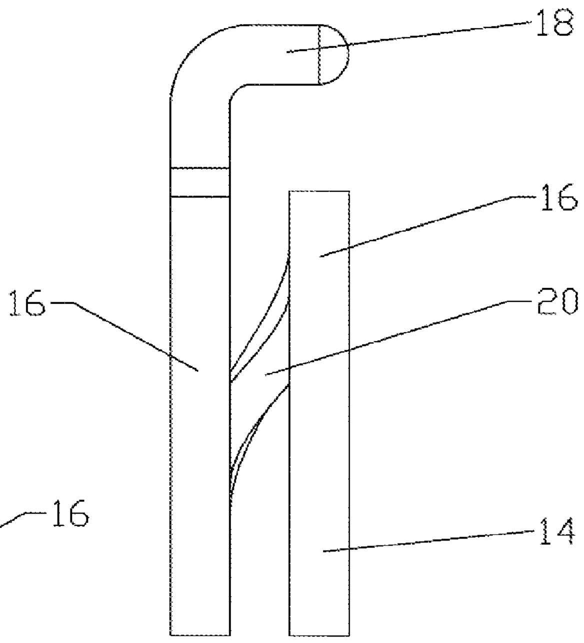
FIG. 4 is a schematic back side view of FIG. 1, with the plurality of supports removed.
Figure 5:
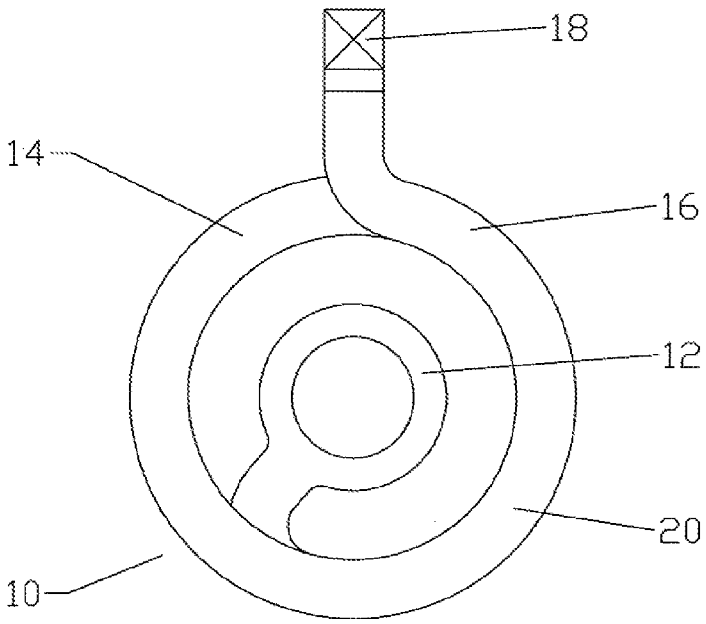
FIG. 5 is a schematic top view of FIG. 4.

The electro-mechanical characteristics of Tungsten and other metals and or metal alloys are known:

| Material | Conductivity % IACS) | Elasticity (PSI) | Tensile Yield (PSI) | Thermal Stability (μin/in-° C.). |
|---|---|---|---|---|
| (CTE) Bronze | 28 | 16 + 10e6 | 63,100 | 20.3 |
| Phosphor Bronze | 16 | 16 + 10e6 | 74,700 | 16.0 |
| Aluminum (7075) | 33 | 10.3 + 10e6 | 73,000 | 23.2 |
| Tungsten | 30 | 59.5 + 10e6 | 109,000 | 4.6 |

Although a shorting stub may survive a relatively high power surge event, deformation of the shorting stub resulting form the surge event may destroy the electrical characteristics of the shorting stub for ongoing operation. The inventor has recognized that, within a common assembly size constraint, a primary limitation of shorting stub design for higher surge capacities is the electro-mechanical characteristics of the materials applied to the shorting stub.

While almost as conductive as Aluminum (high conductivity is a desirable characteristic because higher conductivity lowers the resulting "let thru" of the shorting stub), The inventor's research has revealed that Tungsten will deform far less for vastly higher surge capability (Elasticity and Tensile Strengths) and is more thermally stable thus less prone to frequency response drift. However, the significantly higher material costs of Tungsten material have previously made application of Tungsten cost prohibitive. Although the actual amount of Tungsten required in a finished shorting stub is relatively low, materials waste due to extensive machining and or stamping procedures required to form complex shorting stub geometries increased the materials costs significantly. Further, Tungsten is brittle at ambient temperatures, requiring specialized procedures during machining, stamping, bending and or folding manufacturing operations which further increase manufacturing costs.

Metal Injection Molding (MIM), also known as Powder Injection Molding (PIM), is a net-shape process for producing solid metal parts that combines the design freedom of plastic injection molding with material properties near that of wrought metals. With its inherent design flexibility, MIM is capable of producing an almost limitless array of highly complex geometries in many different metals and metal alloys. Design and economic limitations of traditional metalworking technologies, such as machining and casting, can be overcome by MIM.

In a typical MIM process, finely granulated metal material is uniformly mixed with a wax or polymer binder and injection molded. A "green" molded part is then extracted from the mold. A de-binding step extracts the majority of binder from the green part via application of low temperature and or a solvent. The de-bound green part is then sintered at high temperature wherein the de-bound part is proportionally shrunk to the final target size, concentrating the metal density and strength characteristics to close to that of a casting made from the same material by conventional means.

The inventor has recognized that modified MIM manufacturing technologies may be applied to form the complex shapes of shorting stubs and other RF components using Tungsten and or Tungsten alloys to reduce both the increased materials and machining costs previously associated with Tungsten. Thereby, the invention enables the design and manufacture of shorting stubs and other RF structures that benefit from the improved electromechanical properties of Tungsten and or Tungsten alloys.

Because of the minimal waste inherent in the MIM manufacturing process, although the superior electromechanical properties of Tungsten are realized, the increased costs associated with the application of Tungsten are minimized. Via the present invention, a surge suppressor with improved electrical characteristics including improved multiple strike survivability and significantly increased maximum strike magnitude capacity is enabled.

Exemplary highly compact Multiple Planar Inductive Loop Surge Suppressor configurations and the shorting stubs thereof are disclosed in U.S. patent application Ser. No.: 11/306,872 filed Jan. 13, 2006 titled "Multiple Planar Inductive Loop Surge Suppressor" by Howard Davis and Kendrick Van Swearingen, co-owned with the present application by Andrew Corporation of Westchester, Ill. and hereby incorporated by reference in the entirety.

As shown for example in FIGS. 1-5, a shorting stub may be formed via MIM having a multi-planar configuration. The multi-planar configuration is useful to increase the inductive aspect(s) of the shorting stub, without undesirably increasing the overall size requirements of the finished assembly, and further to reduce the mechanical spring response to surge characteristics of a helical and or spiral configuration. The shorting stub 10 is formed extending outward from an inner conductor connection 12, through a connecting portion 14 that may include one or more loop segment(s) 16 before reaching an outer conductor connection 18. The loop segment (s) 16 may be arranged in parallel planes joined one to another by a transition segment 20.

Figure 6:
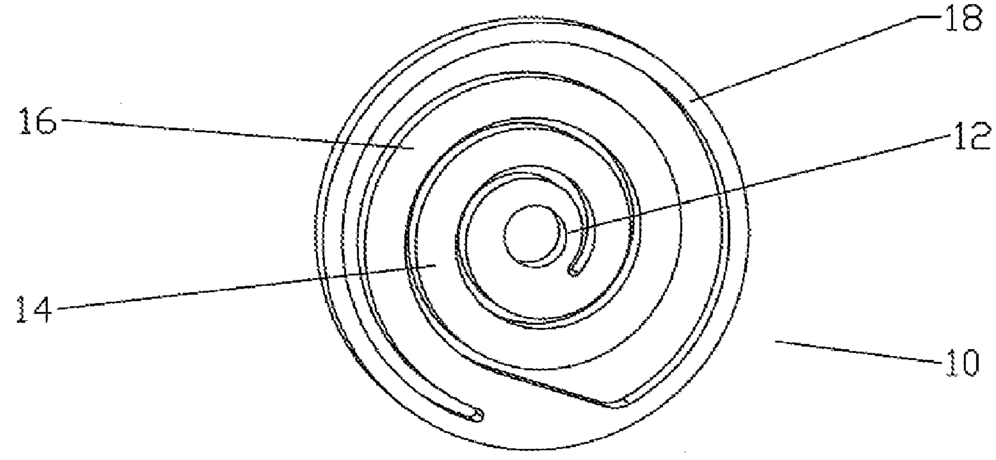
FIG. 6 is a schematic isometric top view of a planar Archimedes spiral shorting stub.
Figure 7:
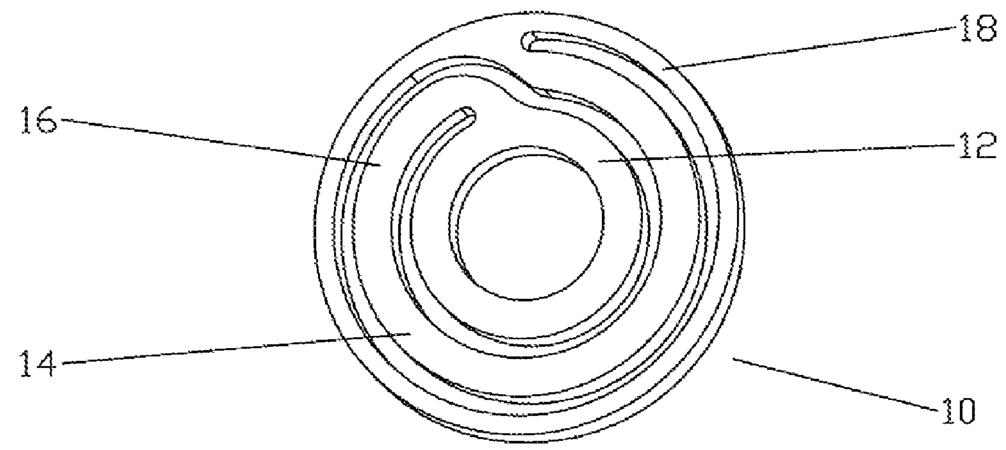
FIG. 7 is a schematic isometric top view of a planar circular spiral shorting stub.
Figure 8:
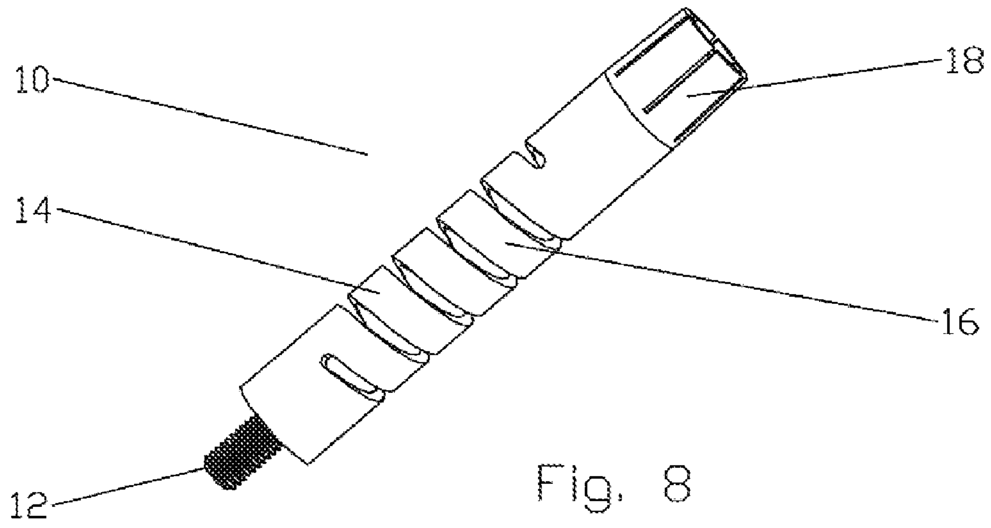
FIG. 8 is a schematic isometric side view of a helical spiral shorting stub.

While the invention has been demonstrated in detail with respect to a specific embodiment of a multiple planar shorting stub, one skilled in the art will recognize that other shorting stub configurations such as single plane spiral and or helical may be similarly applied. As demonstrated in FIGS. 6-8, the loop segment(s) 16 may be formed in a wide range of configurations, or combinations of configurations such as linear, circular, arcurate, spiral, helical or the like. The loop segment (s) 16 may each extend from the inner conductor connection 12 to a common or multiple outer conductor connection(s) 18. Alternatively, the loop segment(s) 16 may be joined end to end. The inner conductor connection 12 and or the outer conductor connection 18 may be formed, for example, as loops, pins, tabs, wedges, screw ends, sockets or the like.

To support multiple planar loop segments in the desired configuration during the mold retraction and or sintering step (s) of the MIM manufacturing process, one or more support (s) 22 may be included in the design that are later easily removed from the finished shorting stub.

Forming each of the support(s) 22, for example, parallel to a longitudinal axis of the inner conductor and with a frangible connection to each of the multiple planar loop segment(s) 16 enables easy removal of the supports without requiring an additional machining step. Placement of the supports along an inner diameter of the loop segment(s) 16 minimizes the overall size requirement of the MIM mold.

Figure 9:
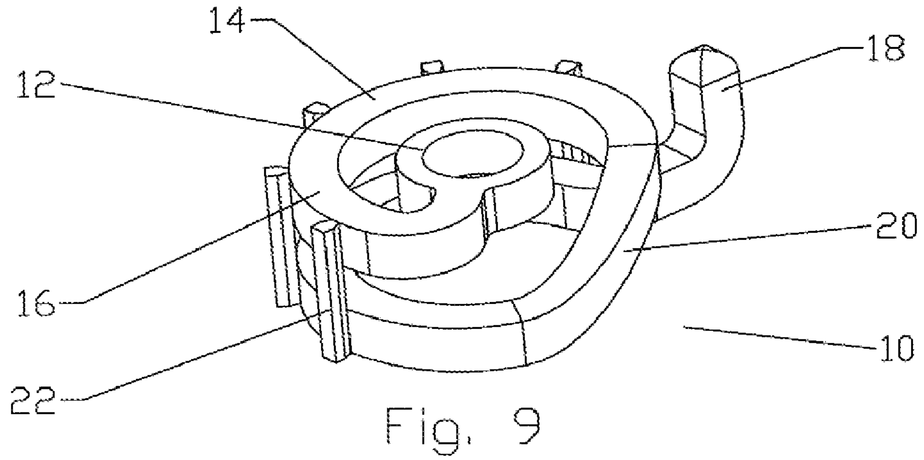
FIG. 9 is a schematic isometric side view of a multi-planar shorting stub including a plurality of outer diameter supports.
Figure 10:
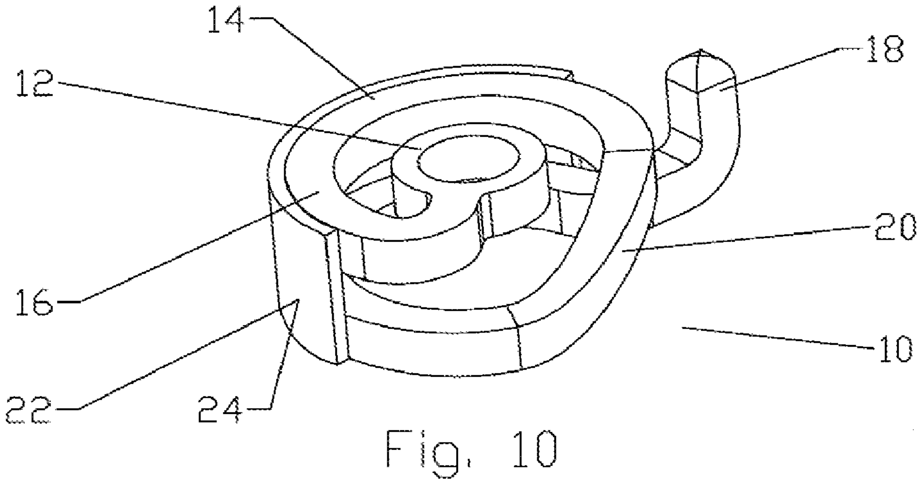
FIG. 10 is a schematic isometric side view of a multi-planar shorting stub including a unitary support band.
Figure 11:
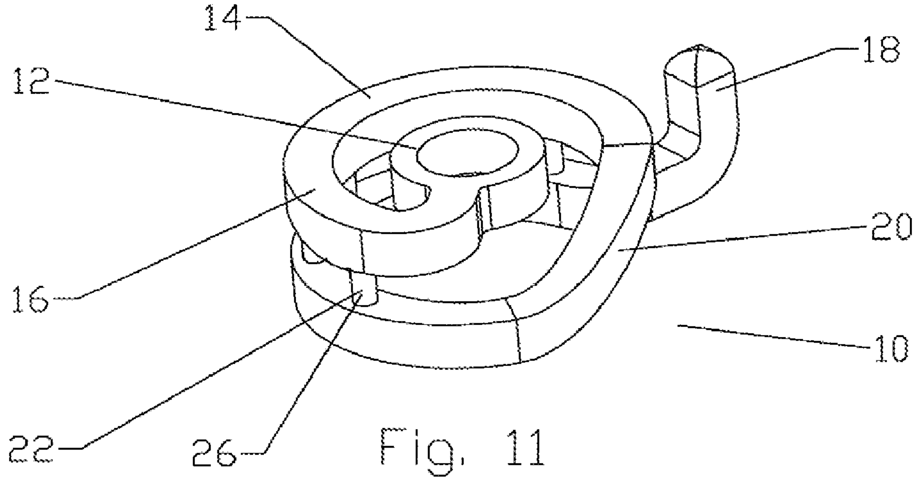
FIG. 11 is a schematic isometric side view of a multi-planar shorting stub including a plurality of post supports.

Alternatively, as demonstrated by FIGS. 9-11, the support (s) 22 may be formed, for example, along the outer diameter of the loop segment(s) 16, as a unitary support band 24 or as post(s) 26 positioned between the loop segment(s) 16. Support (22) configurations of this type may introduce cavities and overhanging portions not easily obtained by single piece molding. In these configurations separate parts may be molded to obtain "green" molded pieces that are then stacked together for the sintering step. The sintering step then joins the mating surfaces of the stacked pieces together to form a single integral component. If the support(s) 22 are formed in a configuration not easily adapted for removal by breaking a frangible joint, they may be removed with a secondary machining operation.

One method of manufacture according to the invention includes the steps of forming a shorting stub 10 according to a desired configuration via MIM manufacturing process(s), the shorting stub 10 formed from Tungsten and or a Tungsten alloy. Any support(s) 22 included in the configuration are removed after at least the sintering steps of the MIM manufacturing process(s) have been completed.

Adaptations to standardized MIM procedures advantageous when Tungsten and or Tungsten alloy material is being applied include selection of a compatible polymer and solvent pair for the de-binding step. Polymer rather than wax may be applied and nitric acid used as the solvent for polymer removal during de-binding. Nitric acid would react with Copper and Copper alloy material, but provides desirable de-binding results when applied to Tungsten or Tungsten alloy material.

Tungsten and or Tungsten alloys may be applied to other RF devices with similar benefit. For example, previously RF filter elements have been manufactured from specialized alloys such as INVAR™ (FeNi36) a Nickel Iron alloy, known for having an extremely low thermal expansion property (2 μin/in-° C.). Application of Tungsten in place of INVAR™ provides an acceptable thermal expansion characteristic at a significant cost reduction.

While a MIM manufacturing process has been identified the invention is not limited thereto, a shorting stub or other RF device such as a filter element may be formed according to the invention from Tungsten and or a Tungsten alloy by other manufacturing processes.

One skilled in the art will appreciate that the present invention represents a significant improvement in power capability, overall size requirements, manufacturing and cost efficiency.

Table of Parts

| | |
|---|---|
| 10 | shorting stub |
| 12 | inner conductor connection |
| 14 | connecting portion |
| 16 | loop segment |
| 18 | outer conductor connection |
| 20 | transition segment |
| 22 | support |
| 24 | unitary support band |
| 26 | post |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A shorting stub for connection between an inner conductor and an outer conductor of a coaxial cable, comprising:

a tungsten or tungsten alloy shorting stub having a connecting portion between an inner conductor connection and an outer conductor connection;

the connecting portion provided with at least two loop segments;

each of the loop segments arranged in a separate, parallel plane;

each of the separate planes aligned parallel to one another and normal to a longitudinal axis of the inner conductor;

each of the loop segments interconnected with at least one other loop segment by a transition section.

2. The shorting stub of claim 1, wherein the connecting portion is formed coaxial around a longitudinal axis parallel to the inner conductor.

3. A method for manufacturing a shorting stub for connection between an inner conductor and an outer conductor of a coaxial cable, comprising the steps of:

forming a tungsten or tungsten alloy shorting stub by metal injection molding; the shorting stub provided with a connecting portion between an inner conductor connection and an outer conductor connection;

the connecting portion provided with at least two loop segments;

each of the loop segments arranged in a separate, parallel plane;

each of the separate planes aligned parallel to one another and normal to a longitudinal axis of the inner conductor;

each of the loop segments interconnected with at least one other loop segment by a transition section; and sintering the shorting stub.

4. The method of claim 3, wherein the the loop segments are supported during the metal injection molding by at least one support.

5. The method of claim 4, further including the step of removing the at least one support after sintering the shorting stub.

6. The method of claim 4, wherein the at least one support has a longitudinal axis parallel to the inner conductor.

7. The method of claim 4, wherein the at least one support is coupled to the loop segments by a frangible connection.

8. The method of claim 4, wherein the at least one support is coupled to the loop segments along an inner surface.

9. The method of claim 4, wherein the at least one support is coupled to the loop segments along an outer surface.

10. The method of claim 4, wherein the at least one support is a unitary support band.

11. The method of claim 4, wherein the at least one support is at least one post between the loop segments.

12. A method for manufacturing a shorting stub for connection between an inner conductor and an outer conductor of a coaxial cable, comprising the steps of:

forming a green part tungsten or tungsten alloy shorting stub by metal injection molding;

the green part tungsten or tungsten alloy shorting stub having a connecting portion between an inner conductor connection and an outer conductor connection;

the connecting portion having multiple loop segments, each of the loop segments arranged in a separate, parallel plane;

each of the separate planes aligned parallel to one another and normal to a longitudinal axis of the inner conductor;

each of the loop segments interconnected with at least one other loop segment by a transition section;

the loop segments supported during the metal injection molding by at least one support;

debinding and sintering the green part tungsten or tungsten alloy shorting stub; and removing the at least one support.

13. The method of claim 12, wherein the at least one support is removed by breaking a frangible connection between the at least one support and the loop segments.

14. The method of claim 12, wherein the green part tungsten or tungsten alloy shorting stub is de-binded from a polymer via application of nitric acid.

15. The method of claim 12, wherein the green part tungsten or tungsten alloy shorting stub is formed in two pieces, the two pieces stacked together prior to the sintering step.

* * * * *